(12) United States Patent
Hokkirigawa et al.

(10) Patent No.: US 6,746,519 B2
(45) Date of Patent: Jun. 8, 2004

(54) AIR CLEANING FILTER

(75) Inventors: Kazuo Hokkirigawa, Yonezawa (JP);
Motoharu Akiyama, Nagano-ken (JP);
Noriyuki Yoshimura, Nagano-ken (JP)

(73) Assignee: Minebea Co., Ltd., Nagano-ken (JP)

( * ) Notice: Subject to any disclaimer, the term of this patent is extended or adjusted under 35 U.S.C. 154(b) by 0 days.

(21) Appl. No.: 10/154,793

(22) Filed: May 24, 2002

(65) Prior Publication Data

US 2002/0174771 A1 Nov. 28, 2002

(30) Foreign Application Priority Data

May 25, 2001 (JP) ........................................ 2001-157551

(51) Int. Cl.$^7$ ............................ B01D 39/14; B01J 20/20
(52) U.S. Cl. ............................ 96/108; 96/154; 55/523; 55/527; 55/DIG. 35
(58) Field of Search ...................... 55/482, 523, 527, 55/528, DIG. 35; 96/108, 131, 153, 154; 501/81, 99

(56) References Cited

PUBLICATIONS

Article: *Development of Hard and Porous Carbon Material "RB Ceramics" Using Rice Bran as a Starting Material*; (Translation from "Zairyou Kagaku", vol. 17, No. 6, pp. 24 to 27, May 1997); Kazuo Hokkirigawa; 10 pages.

*Primary Examiner*—Frank M. Lawrence
(74) *Attorney, Agent, or Firm*—Flynn, Thiel, Boutell & Tanis, P.C.

(57) ABSTRACT

There is provided an air cleaning filter capable of molding into free shapes in which an RB ceramics and/or CRB ceramics of 10 to 2,000 angstrom in pore diameter and 0.1 to 1.1 cm$^8$/g in pore volume is used as an absorbing and filtering material.

11 Claims, 2 Drawing Sheets

CRB particle

Large pore
t>5μm
(Peak 15μm)

CRB resin

Middle pore
0.2μm<t<5μm
(Peak 1.8μm)

Carbonized rice bran

Hard glassy carbon
(Carbonized phenol resin)

Small pore
$t < 0.2 \mu m$
(Peak $0.05 \mu m$)

$Lc \approx 40 Å$
$La \approx 100 Å$

AIR CLEANING FILTER

FIELD OF THE INVENTION

This invention relates to an air cleaning filter generally used for domestic or industrial air conditions and air cleaners.

BACKGROUND OF THE INVENTION

There have been conventionally used active carbon materials such as granular active carbon made of coconut shell, etc., or active carbon fiber made of pitch-, phenol-, polyacrylonitrile (PAN)-, cellulose origins, etc. as an air cleaning filter.

As these active carbon materials are granular or fibrous in shape, it is necessary to securely keep the granules on felt or a non-woven fabric or to knit the fiber into a specific shape.

For example, Japanese Patent No. A-H07-136,502 discloses granular active carbon materials and porous active carbon fiber of 10 to 100 angstrom units in diameter and 0.25 to 1.1 $cm^3/g$ in pore volume.

SUMMARY OF THE INVENTION

Accordingly, it is an object of the present invention to provide an air cleaning filter formed directly into a desired shape by applying RB ceramics and CRB ceramics as a carbon material which is capable of being molded into free shapes.

It has been found that a fine powder of RB ceramics and CRB ceramics exhibits appropriate properties as an air cleaning filter. The present invention has been completed on the basis of this fact.

The present invention relates to an air cleaning filter prepared by using RB ceramics and/or CRB ceramics of 10 to 2,000 angstrom units in pore diameter and 0.1 to 1.1 $cm^3/g$ in pore volume as an absorbing and filtering material, and a dust-proof mask to which the air cleaning filter is applied.

PREFERRED EMBODIMENT OF THE INVENTION

A RB ceramic or CRB ceramic material applied to an air cleaning filter of the present invention is prepared from a defatted product of rice bran as a main raw material and a thermosetting resin.

As is known, Dr. Kazuo Hokkirigawa, the first inventor of the present invention, proposed an idea to obtain a porous carbon material by the use of rice bran which is by-produced 0.9 million ton/year in Japan or 33 million ton/year in the world (see Kinou Zairyou, Vol. 17, No. 5, pp. 24 to 28, May 1997).

The above-mentioned literature describes a method for preparing a carbon material or so-called RB ceramic by mixing and kneading a defatted product of rice bran and a thermosetting resin, press-molding the mixture to form a molded material, drying and then baking the dried material in an atmosphere of inert gas.

Defatted rice bran used in the present invention is not limited to a specific species of rice and may either be a product of Japan or foreign countries.

A thermosetting resin used herein may also be any resin which can be thermally set and typically includes phenol-, diarylphthalate-, unsaturated polyester-, epoxy-, polyimide- and triazine resins, although a phenol resin is preferably used.

A thermoplastic resin such as polyamide may be used together without departing from the scope of the present invention.

A mixing ratio of the defatted rice bran and the thermosetting resin is in the range of 50 to 90:50 to 10 and preferably 70 to 80:30 to 20 by weight.

According to the above mentioned method, the difference in ratio of shrinkage between the press-molded material and the finally molded material which is baked in an atmosphere of inert gas reached almost 25%. Such a difference made it substantially difficult to form a precisely molded material, but finally has been improved as a result of development of CRB ceramics.

CRB ceramics used in the present invention is an improved material of RB ceramics obtained from defatted rice bran and a thermosetting resin and is prepared by mixing and kneading both of these materials. The defatted product of rice bran and the thermosetting resin are mixed and kneaded, primarily baked in an inert gas at 700 to 1,000° C. and ground to form a carbonated powder of about 60 mesh or less. The powder is then mixed and kneaded with the thermosetting resin to yield a mixture, press-molded at a pressure of 20 to 30 MPa and further heat-treating the thus molded material in an atmosphere of inert gas at 500 to 1,100° C. to form a molded product.

CRB ceramics is a porous material having innumerable pores. These pores formed on CRB ceramics are classified into three kinds depending on a formation process thereof.

Figure 1A:
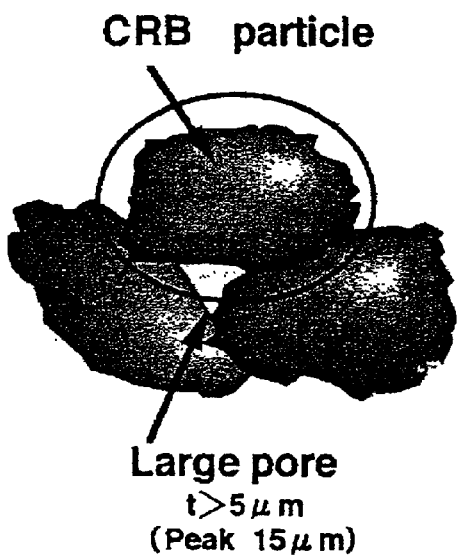
FIG. 1a is an illustration of the relatively large pores of CRB ceramics.

The pore shown in FIG. 1(a) is a relatively large one having a pore diameter of 5 $\mu$m or more, which is formed as a space between CRB fine particles when they overlap each other. A peak pore value of this type is about 15 $\mu$m.

Figure 1B:
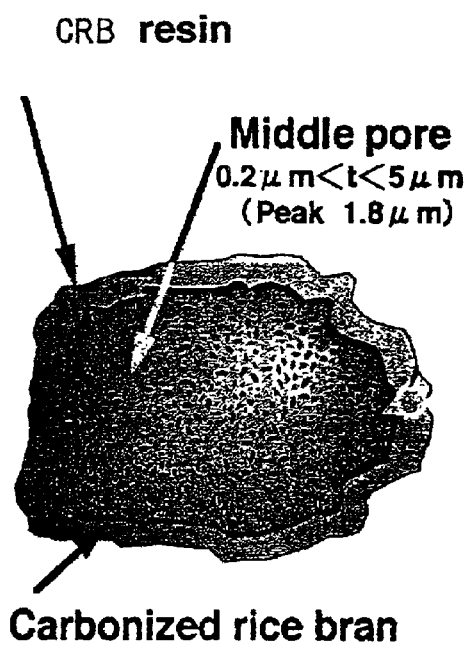
FIG. 1b is an illustration of pores of CRB ceramics caused by rice bran.

What is shown in FIG. 1(b) is a pore having a pore diameter of less than 5 $\mu$m which is formed by a fiber structure caused by rice bran. A peak pore value of this type is about 1.8 $\mu$m.

Figure 1C:
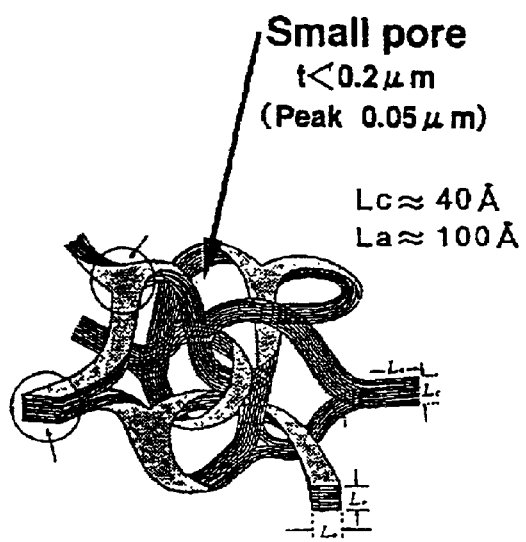
FIG. 1c is an illustration of pores of CRB ceramics caused by polymer chain.

The pore shown in FIG. 1(c) is a small one having a pore diameter of 0.2 $\mu$m or less which is formed as a space between molecular chains of a high molecular polymer such as a phenol resin when the polymer is carbonated at high temperature. A peak pore value is about 0.05 $\mu$m.

The thus formed three kinds of pores of CRB ceramics function as a filter for fine particles of various size corresponding to each pore diameter, respectively.

The most typical distinction of RB and CRB ceramics is that a difference in ratio of shrinkage between molded RB ceramics and a final product thereof is almost 25%, while that of CRB ceramic is so low as 3% or less, which makes the latter material very useful.

General properties of RB ceramics and CRB ceramics are as in the following:
- extremely high hardness;
- extremely small heat expansion coefficient;
- porous structure;
- electrical conductivity;
- low specific gravity, light weight;
- improved abrasion resistance;
- easiness of molding and mold-die making;
- capable of powdering; and
- less negative effect to global environment and more resource conservation due to rice bran being used as a starting material.

When an air cleaning filter is prepared directly from RB ceramics and/or CRB ceramics as a molded material, it is suitable to use CRB ceramics because of its precise moldability. However, even in the above mentioned case, RB ceramics should not be excluded from embodiments of the present invention, because it is possible to mold RB ceramics by means of a little bit larger mold die which is then reduced to a desired size through secondary processing.

Porosity of RB ceramics and/or CRB ceramics can be controlled by changing baking conditions, which is one of the characteristic features of these materials.

It is generally confirmed that the porosity is increased with an increase in heat treating temperature.

When an air cleaning filter is prepared as a molded product directly from RB ceramics and/or CRB ceramics according to the present invention, the molded material suitably has a pore diameter of 10 to 2,000 angstrom units and a pore volume of 0.1 to 1.1 $cm^3/g$.

When powdery RB ceramic is used in the present invention, it is not necessary to consider the difference in shrinkage between RB and CRB ceramics so that basically either of these materials may be used on an equal footing. Particle size of RB ceramics or CRB ceramics powder varies depending on the purpose to be used, although an average particle diameter of 0.1 to 500 $\mu$m is generally used.

Porosity is an important factor to RB ceramics and/or CRB ceramics used in the present invention, which is influenced by the primary baking temperature of RB ceramics and by both the primary baking temperature and the secondary heat treating temperature of CRB ceramics.

RB ceramics or CRB ceramics of optimum porosity can be yielded by primary baking or secondary heat treatment thereof at a temperature of 800 to 1,000° C.

When RB ceramics and/or CRB ceramics is used as a fine powder, non-woven fabric or felt is a suitable material to support the powder. A well-known carbon fine powder may be used together with the ceramics powder.

A ratio of the fine powder of RB ceramics and/or CRB ceramics to that of carbon powder is 50 to 90:50 to 10 by weight.

The fine powder of RB ceramics or CRB ceramics is hard, while its surface is quite rough, which characteristically increases the maintaining properties thereof as a powdery material on a support and makes the powder hardly fly away by fluid flow.

The above-mentioned non-woven fabric or felt may either be fully or partially made of carbon fiber.

A fibrous material used herein includes granular active carbon such as coconut shell active carbon, and active carbon fiber such as pitch-, phenol-, polyacrylonitrile (PAN)- and cellulose origins.

Further, there may be used inorganic materials such as glass wool and asbestos, synthetic polymers such as polyester and polyamide and natural materials such as cellulose, hemp and cotton as a fibrous material in the present invention.

An air cleaning filter of the present invention prepared by supporting the fine powder of RB ceramics and/or CRB ceramics on non-woven fabric or felt may be used as a dust-proof mask as it is.

Embodiments of the present invention will be summarized as in the following.

1. An air cleaning filter in which RB ceramics and/or CRB ceramics of 10 to 2,000 angstrom units in pore diameter and 0.1 to 1.1 $cm^3/g$ in pore volume is used as an absorbing and filtering material.

2. An air cleaning filter described in the above item 1 in which the RB ceramics and/or CRB ceramics is a filter molded into a thin plate-form.

3. An air cleaning filter described in the above item 2 in which a plurality of thin plate-formed filters are stacked.

4. An air cleaning filter described in the above item 1 in which the RB ceramics and/or CRB ceramics is a filter molded into a thin cylinder-form.

5. An air cleaning filter described in the above item 4 in which a plurality of thin cylinder-formed filters are stacked while altering the diameter of each cylinder.

6. An air cleaning filter described in the above item 1 in which the RB ceramics and/or CRB ceramics is a filter molded into a solid cylinder-form.

7. An air cleaning filter in which an RB ceramics fine powder and/or CRB ceramics fine powder with an average of 0.1 to 500 $\mu$m in particle diameter, 10 to 2,000 angstrom in pore diameter and 0.1 to 1.1 $cm^3/g$ in pore volume is supported on non-woven fabric or felt.

8. An air cleaning filter described in the above item 7 in which a well-known active carbon fine powder is supported on a non-woven fabric or felt in addition to an RB ceramics fine powder and/or CRB ceramics fine powder.

9. An air cleaning filter described in the above item 8 in which a ratio of an RB ceramics fine powder and/or CRB ceramics fine powder to a well-known active carbon fine powder is 50 to 90:50 to 10 by weight.

10. An air cleaning filter described in the above item 7 in which the non-woven fabric or felt is an active carbon fiber selected from pitch-, phenol-, polyacrylonitrile (PAN)- and cellulose fibers.

11. A dust-proof mask in which an RB ceramics fine powder and/or CRB ceramics fine powder having an average of 0.1 to 500 $\mu$m in particle diameter, 10 to 2,000 angstrom in pore diameter and 0.1 to 1.1 $cm^3/g$ in pore volume is supported on non-woven fabric or felt.

It has been found that an air cleaning filter of the present invention can be molded into free shapes while keeping predetermined properties due to the use of RB ceramics and CRB ceramics. It has been also found that fine powder of RB ceramics and CRB ceramics exhibits suitable properties as an air cleaning filter.

The present invention will be further described in the following examples.

EXAMPLE 1

Preparation of CRB Ceramics Precursor

A defatted product of rice bran in an amount of 75 kg and a liquid phenol resin (resol) in an amount of 25 kg were mixed and kneaded by heating at 50 to 60° C. to form a plastic and homogeneous mixture.

The mixture was primarily baked by means of a rotary kiln in a nitrogen atmosphere at 900° C. for 60 minutes. The carbonated material thus baked was screened through a 300 mesh-screen to form a carbonated powder of 50 to 80 $\mu$m in particle diameter.

The carbonated powder in an amount of 75 kg and a solid phenol (resol) in an amount of 25 kg were mixed and kneaded by heating at 100 to 150° C. to form a plastic and homogenous mixture as a plastic CRB ceramics precursor.

Molding of an Air Cleaning Filter

Figure 2:
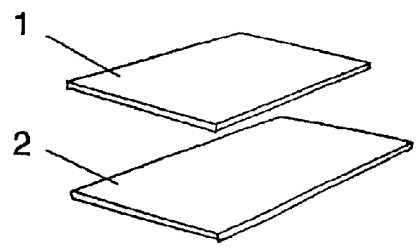
FIG. 2 is a perspective view of a plate type air cleaning filter of the present invention.

Then, there was made a mold die for molding a plate-formed body 1 of 25 cm wide×50 cm long×0.5 cm thick as shown in FIG. 2, to which the plastic CRB ceramics precursor was poured to press-mold at a pressure of 22 MPa. The mold die temperature was 150° C.

The thus molded body was taken out of the mold die and subjected to a heat treatment by heating-up to 500° C. in a nitrogen atmosphere at a heat rising rate of 1° C. per minute and keeping at 500° C. for 60 minutes and then at 1,000° C. for about 120 minutes.

The molded body was then cooled at a cool down rate of 2 to 3° C. per minute down to 500° C., followed by natural heat dissipation under 500° C. to yield a CRB ceramics molded product 1 as shown in FIG. 2.

Properties of the Air Filter

The CRB ceramics molded product 1 showed a pore diameter of an average of 300 angstrom units and a pore volume of 0.68 cm$^3$/g.

EXAMPLE 2

Preparation of CRB Ceramics Precursor

A defatted product of rice bran in an amount of 75 kg and a liquid phenol resin (resol) in an amount of 25 kg were mixed and kneaded by heating at 50 to 60° C. to form a plastic and homogeneous mixture.

The mixture was primarily baked by means of a rotary kiln in a nitrogen atmosphere at 900° C. for 60 minutes. The carbonated material thus baked was screened through a 200 mesh-screen to form a carbonated powder of 50 to 120 $\mu$m in particle diameter.

The carbonated powder thus obtained in an amount of 75 kg and a solid phenol (resol) in an amount of 25 kg were mixed and kneaded by heating at 100 to 150° C. to form a plastic and homogeneous mixture as a plastic CRB ceramics precursor.

Molding of an Air Cleaning Filter

Then, there was made a mold die for molding a plate-formed body 2 of 25 cm wide×50 cm long×0.25 cm thick as shown in FIG. 2, to which the plastic CRB ceramics precursor was poured to press-mold at a pressure of 22 MPa. The mold die temperature was 150° C.

The thus molded body was taken out of the mold die and subjected to a heat treatment by heating-up to 500° C. in a nitrogen atmosphere at a heat rising rate of 1° C. per minute and keeping at 500° C. for 60 minutes and then at 1,000° C. for about 150 minutes.

The molded body was then cooled at a cool down rate of 2 to 3° C. per minute down to 500° C., followed by natural heat dissipation under 500° C. to yield a CRB ceramics molded product 2 as shown in FIG. 2.

Properties of the Air Cleaning Filter

The CRB ceramics molded product 2 showed a pore diameter of an average of 480 angstrom units and a pore volume of 0.62 cm$^3$/g.

The molded products 1 and 2 shown in FIG. 2 were successfully used in combination.

EXAMPLE 3

Preparation of CRB Ceramics Precursor

A defatted product of rice bran in an amount of 75 kg and a liquid phenol resin (resol) in an amount of 25 kg were mixed and kneaded by heating at 50 to 60° C. to form a plastic and homogeneous mixture.

Molding of an Air Cleaning Filter

Then, there was made a mold die for molding a plate-formed body 2 of 25 cm wide and 50 cm long similarly as Example 1 as shown in FIG. 2 except that thickness thereof is 0.3 cm, to which the plastic CRB ceramics precursor was poured to press-mold at a pressure of 22 MPa. The mold die temperature was 150° C.

The thus molded body was taken out of the mold die and subjected to a heat treatment by heating-up to 500° C. in a nitrogen atmosphere at a heat rising rate of 1° C. per minute and keeping at 800° C. for about 120 minutes. The molded body was then cooled at a cool down rate of 2 to 3° C. per minute down to 500° C., followed by natural heat dissipation under 500° C.

Properties of the Air Cleaning Filter

The RB ceramics molded product 2 showed a pore diameter of an average of 400 angstrom units and a pore volume of 0.50 cm$^3$/g, although it shrank slightly. Two of the product 2 were stacked to successfully be used as an air cleaning filter.

EXAMPLE 4

Preparation of CRB Ceramics Precursor

A defatted product of rice bran in an amount of 75 kg and a liquid phenol resin (resol) in an amount of 25 kg were mixed and kneaded by heating at 50 to 60° C. to form a plastic and homogeneous mixture.

The mixture was primarily baked by means of a rotary kiln in a nitrogen atmosphere at 900° C. for 60 minutes. The carbonated material thus baked was screened through a 100 mesh-screen to form a carbonated powder of 50 to 250 $\mu$m in particle diameter.

The carbonated powder thus obtained in an amount of 75 kg and a solid phenol (resol) in an amount of 25 kg were mixed and kneaded by heating at 100 to 150° C. to form a plastic and homogeneous mixture as a plastic CRB ceramics precursor.

Molding of an Air Cleaning Filter

Figure 3:
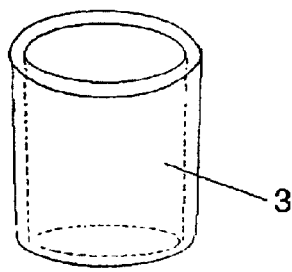
FIG. 3 is a perspective view of a cylindrical air cleaning filter of the present invention.

Then, there was made a mold die for molding a cylinder of 15 cm in outer diameter×14.5 cm in inner diameter×30 cm in length as shown in FIG. 3, to which the plastic CRB ceramics precursor was poured to press-mold at a pressure of 22 MPa. The mold die temperature was 150° C.

The thus molded body was taken out of the mold die and subjected to a heat treatment by heating-up to 500° C. in a nitrogen atmosphere at a heat rising rate of 1° C. per minute and keeping at 500° C. for 60 minutes and then at 950° C. for about 120 minutes.

The molded body was then cooled at a cool down rate of 2 to 3° C. per minute down to 500° C., followed by natural heat dissipation under 500° C. to yield a CRB ceramics molded product 3 as shown in FIG. 3.

Properties of the Air Cleaning Filter

The CRB ceramics molded product 3 showed a pore diameter of an average of 450 angstrom units and a pore volume of 0.49 cm$^3$/g.

EXAMPLE 5

Preparation of CRB Ceramics

A defatted product of rice bran in an amount of 75 kg and a liquid phenol resin (resol) in an amount of 25 kg were mixed and kneaded by heating at 50 to 60° C. to form a plastic and homogeneous mixture.

The mixture was primarily baked by means of a rotary kiln in a nitrogen atmosphere at 900° C. for 60 minutes. The carbonated material thus baked was ground by means of a grinder and then screened through a 100 mesh-screen to form a carbonated powder of 50 to 250 μm in particle diameter.

The carbonated powder in an amount of 75 kg and a solid phenol (resol) in an amount of 25 kg were mixed and kneaded by heating at 100 to 150° C. to form a plastic and homogeneous mixture.

Preparation of a Fine Powder

The plastic mixture was then press-molded at a pressure of 20 MPa to form a spherical body of 3 cm in diameter. The mold die temperature was 150° C.

The thus molded body was taken out of the mold die, heated up to 500° C. in a nitrogen atmosphere at a heat rising rate of 1° C. per minute, kept at 500° C. for 60 minutes and sintered at 900° C. for about 120 minutes.

The sintered body was then cooled at a cool down rate of 2 to 3° C. per minute down to 500° C., followed by natural heat dissipation under 500° C.

The spherical body of 3 cm in diameter was ground by means of a grinder and further finely ground by means of a ball mill to form fine CRB ceramics particles of average 1 to 3 μm in particle diameter.

Preparation of an Air Cleaning Filter

CRB ceramics fine particles of average 1 μm in diameter were applied to felt made of pitch active carbon fiber (FN-300GF.10: available from Osaka Gas Chemical Co., Ltd.) in a ratio of (CRB particles) 500 g/m$^2$.

Properties of the Air Cleaning Filter

The CRB ceramics fine particles of average 1 μm in diameter showed a pore volume of 0.87 cm$^3$/g.

What is claimed is:

1. An air cleaning device comprising a filter medium for separating a contaminant from air, said filter medium comprising an air filter made from at least one of an RB ceramic and a CRB ceramic and having a pore diameter of from 10 to 2,000 angstrom units and a pore volume of 0.1 to 1.1 cm$^3$/g, the RB ceramic being formed from a carbonaceous material obtained by mixing a degreased bran derived from rice bran with a thermosetting resin to form a first mixture, kneading the first mixture, pressure forming the kneaded first mixture to form a compact of the first mixture, drying the compact of the first mixture and baking the dried compact of the first mixture in an inert gas atmosphere at a temperature in a range of 700 to 1000° C. and the CRB ceramic being formed by mixing a powder of the carbonaceous material with a thermosetting resin to form a second mixture, kneading the second mixture, pressure forming the kneaded second mixture at a pressure in a range of from 20 to 30 MPa to form a compact of the kneaded second mixture and baking the compact of the second mixture in an inert gas atmosphere at a temperature in a range of 500 to 1100° C.

2. The device of claim 1, wherein the air filter is molded into a form of a thin plate.

3. The device of claim 2, wherein a plurality of stacked thin plates form the air filter.

4. The device of claim 1, wherein the air filter is molded into a form of a thin cylinder.

5. The device of claim 4, wherein a plurality of overlapping thin cylinders having different diameters form the air filter.

6. The device of claim 1, wherein the air filter is molded into a form of a solid cylinder.

7. An air cleaning device comprising a filter medium for separating a contaminant from air, said filter medium comprising an air filter being made from at least one of an RB ceramic and a CRB ceramic fine powder supported on a non-woven fabric or felt and having a pore diameter of from 10 to 2,000 angstrom units and a pore volume of 0.1 to 1.1 cm$^3$/g, the RB ceramic being formed from a carbonaceous material obtained by mixing a degreased bran derived from rice bran with a thermosetting resin to form a first mixture, kneading the first mixture, pressure forming the kneaded first mixture to form a compact of the first mixture, drying the compact of the first mixture and baking the dried compact of the first mixture in an inert gas atmosphere at a temperature in a range of 700 to 1000° C. and the CRB ceramic being formed by mixing a powder of the carbonaceous material with a thermosetting resin to form a second mixture, kneading the second mixture, pressure forming the kneaded second mixture at a pressure in a range of from 20 to 30 MPa to form a compact of the kneaded second mixture and baking the compact of the second mixture in an inert gas atmosphere at a temperature in a range of 500 to 1100° C.

8. The device of claim 7, additionally comprising a carbon fine powder supported on the non-woven fabric or felt.

9. The device of claim 8, wherein the ratio of at least one of the RB ceramic and CRB ceramic fine powder to the carbon fine powder is from 50:90 to 50:10 by weight.

10. The device of claim 7, wherein the non-woven fiber or felt is an active carbon fiber selected from the group consisting of pitch fibers, phenol fibers, polyacrylonitrile fibers and cellulose fibers.

11. A dust-proof mask comprising a filter medium for separating a contaminant from air, said filter medium comprising an air filter being made from at least one of an RB ceramic and a CRB ceramic fine powder supported on a non-woven fabric or felt and having a pore diameter of from 10 to 2,000 angstrom units and a pore volume of 0.1 to 1.1 cm$^3$/g, the RB ceramic being formed from a carbonaceous material obtained by mixing a degreased bran derived from rice bran with a thermosetting resin to form a first mixture, kneading the first mixture, pressure forming the kneaded first mixture to form a compact of the first mixture, drying the compact of the first mixture and baking the dried compact of the first mixture in an inert gas atmosphere at a temperature in a range of 700 to 1000° C. and the CRB ceramic being formed by mixing a powder of the carbonaceous material with a thermosetting resin to form a second mixture, kneading the second mixture, pressure forming the kneaded second mixture at a pressure in a range of from 20 to 30 MPa to form a compact of the kneaded second mixture and baking the compact of the second mixture in an inert gas atmosphere at a temperature in a range of 500 to 1100° C.

* * * * *